United States Patent
Komura

(10) Patent No.: US 11,091,114 B2
(45) Date of Patent: Aug. 17, 2021

(54) AIRBAG DEVICE

(71) Applicant: Toyota Jidosha Kabushiki Kaisha, Toyota (JP)

(72) Inventor: Takamichi Komura, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 70 days.

(21) Appl. No.: 16/565,725

(22) Filed: Sep. 10, 2019

(65) Prior Publication Data

US 2020/0180546 A1  Jun. 11, 2020

(30) Foreign Application Priority Data

Dec. 7, 2018 (JP) .............................. JP2018-230231

(51) Int. Cl.
| | | |
|---|---|---|
| *B60R 21/231* | (2011.01) | |
| *B60R 21/207* | (2006.01) | |
| *B60R 21/233* | (2006.01) | |
| *B60R 21/00* | (2006.01) | |

(52) U.S. Cl.
CPC ...... *B60R 21/23138* (2013.01); *B60R 21/207* (2013.01); *B60R 21/233* (2013.01); *B60R 2021/0006* (2013.01); *B60R 2021/0032* (2013.01); *B60R 2021/23324* (2013.01)

(58) Field of Classification Search
CPC ............ B60R 21/207; B60R 21/23138; B60R 2021/23146; B60R 2021/23161; B60R 2021/23324
See application file for complete search history.

(56) References Cited

U.S. PATENT DOCUMENTS

| | | | | |
|---|---|---|---|---|
| 5,499,840 A | * | 3/1996 | Nakano | ................ B60N 2/0705 280/730.1 |
| 5,853,191 A | * | 12/1998 | Lachat | .............. B60R 21/23138 280/730.2 |
| 10,351,092 B2 | * | 7/2019 | Taguchi | ............ B60R 21/23138 |
| 2007/0096444 A1 | * | 5/2007 | Bostrom | ........... B60R 21/23138 280/730.2 |
| 2014/0151984 A1 | | 6/2014 | Fukawatase et al. | |
| 2016/0229369 A1 | * | 8/2016 | Thomas | ................ B60R 21/231 |
| 2019/0061676 A1 | * | 2/2019 | Kwon | .................... B60R 21/233 |
| 2019/0283703 A1 | * | 9/2019 | Marciniak | ........... B60R 21/0132 |
| 2020/0130629 A1 | * | 4/2020 | Fuma | .................... B60R 21/264 |
| 2020/0317155 A1 | * | 10/2020 | Deng | ..................... B60R 21/20 |

FOREIGN PATENT DOCUMENTS

| | | |
|---|---|---|
| JP | 2010115947 A | 5/2010 |
| JP | 2014069729 A | 4/2014 |
| JP | 2014108740 A | 6/2014 |

* cited by examiner

*Primary Examiner* — Paul N Dickson
*Assistant Examiner* — Mary E Young
(74) *Attorney, Agent, or Firm* — Dinsmore & Shohl LLP

(57) ABSTRACT

An airbag device includes a main bag configured to be inflated when gas is supplied into the main bag, the main bag configured to be deployed between first and second vehicle seats disposed adjacent to each other in a vehicle width direction in vehicle front view and toward a lateral side of an occupant seated in the first vehicle seat. The airbag device further includes a sub-bag configured to be inflated when gas is supplied into the sub-bag, the sub-bag configured to be disposed between a portion of the main bag in an upper part of the main bag and the second vehicle seat.

6 Claims, 4 Drawing Sheets

AIRBAG DEVICE

CROSS-REFERENCE TO RELATED APPLICATIONS

This application claims priority to Japanese Patent Application No. 2018-230231 filed on Dec. 7, 2018, which is incorporated herein by reference in its entirety including the specification, drawings and abstract.

BACKGROUND

1. Technical Field

The disclosure relates to an airbag device.

2. Description of Related Art

Japanese Unexamined Patent Application Publication No. 2014-069729 (JP 2014-069729 A) discloses an airbag device including a main bag portion configured to be deployed toward the lateral side (vehicle width direction inner side) of an occupant seated in a vehicle seat, and a sub-bag portion configured to be deployed from an intermediate portion, in the vehicle up-down direction, of the main bag portion toward an upper surface of a console. With the airbag device described in JP 2014-069729 A, the fall-down of the main bag portion is suppressed by the sub-bag portion receiving a reaction force from the upper surface of the console.

Japanese Unexamined Patent Application Publication No. 2010-115947 (JP 2010-115947 A) discloses an airbag device including a main bag configured to be deployed between a vehicle seat for use as a driver seat and a vehicle seat for use as a front passenger seat. The airbag device further includes a sub-bag configured to be deployed from the main bag toward the door trim side on the front passenger seat side when no occupant is seated in the front passenger seat. With the airbag device described in JP 2010-115947 A, the fall-down of the main bag is suppressed by the sub-bag receiving a reaction force from the door trim.

SUMMARY

However, with the airbag device described in JP 2014-069729 A, while the fall-down of a portion, corresponding to the sub-bag portion, of the main bag portion (main bag) can be effectively suppressed, there is still room for improvement in terms of suppressing the fall-down of a portion, above the sub-bag portion, of the main bag portion.

With the airbag device described in JP 2010-115947 A, it is difficult to suppress the fall-down of the main bag when an occupant is seated in the front passenger seat.

Under these circumstances, it is an object of the disclosure to provide an airbag device that can effectively suppress the fall-down of a portion of a main bag in the upper part of the main bag configured to be deployed toward the lateral side of an occupant seated in a vehicle seat, regardless of whether or not an occupant is seated in an adjacent vehicle seat.

A first aspect of the disclosure relates to an airbag device including a main bag and a sub-bag. The main bag is configured to be inflated when gas is supplied into the main bag, and configured to be deployed between first and second vehicle seats disposed adjacent to each other in a vehicle width direction in vehicle front view and toward a lateral side of an occupant seated in the first vehicle seat. The sub-bag is configured to be inflated when gas is supplied into the sub-bag, and configured to be disposed between a portion of the main bag in an upper part of the main bag and the second vehicle seat.

With the airbag device according to the first aspect, the main bag is inflated when gas is supplied into the main bag. Consequently, the main bag is deployed between the first and second vehicle seats and toward the lateral side of the occupant seated in the first vehicle seat. Further, the sub-bag is inflated when gas is supplied into the sub-bag. Consequently, the sub-bag is disposed between the portion of the main bag in the upper part of the main bag and the second vehicle seat. Herein, it is expected that when the main bag is pressed toward the second vehicle seat side by the occupant seated in the first vehicle seat, the portion of the main bag in the upper part of the main bag falls down toward the second vehicle seat side. However, with the airbag device according to the first aspect, the fall-down of the portion of the main bag in the upper part of the main bag toward the second vehicle seat side can be restricted by the sub-bag. The sub-bag can be deployed regardless of whether or not an occupant is seated in the second vehicle seat.

According to a second aspect of the disclosure, in the airbag device according to the first aspect, the main bag and the sub-bag may be formed integrally with each other; and the sub-bag may protrude from the portion of the main bag in the upper part of the main bag toward the second vehicle seat when the gas is supplied into the sub-bag from the main bag side.

With the airbag device according to the second aspect, the main bag and the sub-bag are formed integrally with each other, and further the gas is supplied into the sub-bag from the main bag side. Consequently, it is possible to suppress an increase in the number of airbags (main bag and sub-bag) and an increase in the number of devices that supply gas into the airbags.

According to a third aspect of the disclosure, in the airbag device according to the first or second aspect, the pressure of the gas in the sub-bag may be higher than the pressure of the gas in the main bag.

With the airbag device according to the third aspect, the pressure of the gas in the sub-bag is higher than the pressure of the gas in the main bag. Consequently, when the sub-bag is pressed by the portion of the main bag in the upper part of the main bag, it is possible to suppress the deformation of the sub-bag. As a result, it is possible to further suppress the fall-down of the portion of the main bag in the upper part of the main bag toward the second vehicle seat side.

According to a fourth aspect of the disclosure, in the airbag device according to the third aspect, a partition wall configured to separate a space in the main bag and a space in the sub-bag may be provided between the main bag and the sub-bag; and the partition wall may be provided with a check valve that allows flow of the gas from the main bag side to the sub-bag side and prevents flow of the gas from the sub-bag side to the main bag side.

With the airbag device according to the fourth aspect, the gas flows from the main bag side to the sub-bag side through the check valve provided to the partition wall. Further, the gas in the sub-bag is prevented from flowing to the main bag side by the partition wall and the check valve. Consequently, lowering of the pressure of the gas in the sub-bag is suppressed so that it is possible to further suppress the fall-down of the portion of the main bag in the upper part of the main bag toward the second vehicle seat side.

According to a fifth aspect of the disclosure, in the airbag device according to the third or fourth aspect, the main bag and the sub-bag may be provided on each of the first vehicle seat side and the second vehicle seat side; the main bag and the sub-bag provided on the first vehicle seat side may be deployed at the time of a side collision from the second vehicle seat side; and the main bag and the sub-bag provided on the second vehicle seat side may be deployed at the time of a side collision from the first vehicle seat side.

With the airbag device according to the fifth aspect, the movement of the occupant seated in the first vehicle seat toward the vehicle width direction inner side and the movement of the occupant seated in the second vehicle seat toward the vehicle width direction inner side can be suppressed according to the direction of the side collision.

An airbag device according to the disclosure has an excellent effect that it is possible to effectively suppress the fall-down of a portion of a main bag in the upper part of the main bag configured to be deployed toward the lateral side of an occupant seated in a vehicle seat, regardless of whether or not an occupant is seated in an adjacent vehicle seat.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
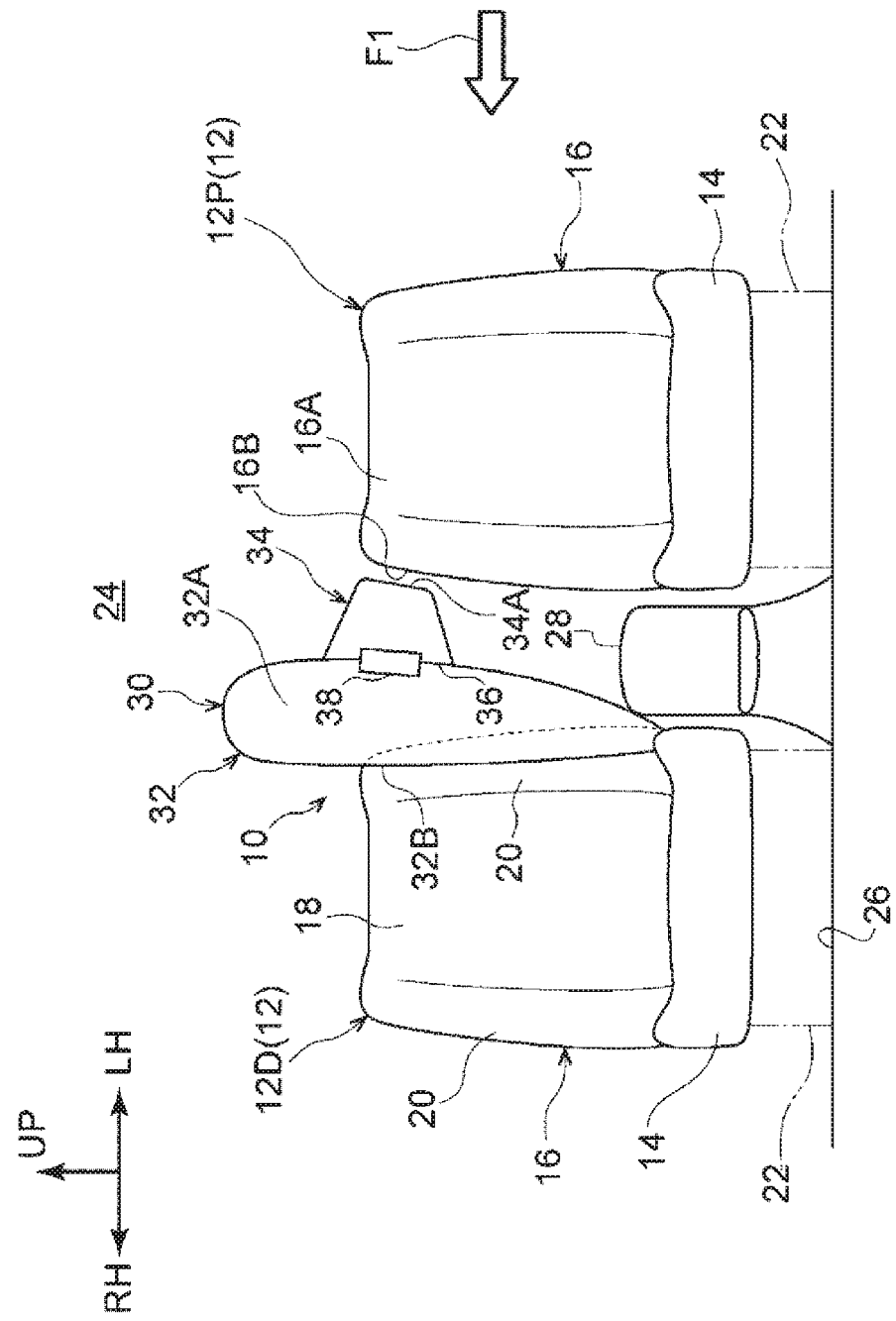
FIG. 1 is a front view in which a driver seat and a front passenger seat provided in a cabin are viewed from the vehicle front side, and illustrates a state in which an airbag of an airbag device according to a first embodiment is deployed.

An airbag device 10 according to a first embodiment of the disclosure will be described with reference to FIG. 1. In the drawings, arrow Up, arrow RH, and arrow LH respectively indicate a vehicle up-down direction upper side, a vehicle width direction right side as viewed from a seated occupant, and a vehicle width direction left side as viewed from the seated occupant. Unless specifically stated otherwise, when a description is given below simply using a front-rear direction, a right-left direction, and an up-down direction, those directions respectively indicate front-rear in the vehicle front-rear direction, right-left in the vehicle right-left direction (vehicle width direction), and up-down in the vehicle up-down direction.

As illustrated in FIG. 1, the airbag device 10 of this embodiment is installed in a vehicle seat 12. Herein, in this embodiment, a vehicle seat 12 for use as a driver seat 12D and a vehicle seat 12 for use as a front passenger seat 12P are disposed adjacent to each other in the vehicle width direction. The airbag device 10 is installed in the vehicle seat 12 for use as the driver seat 12D.

The vehicle seat 12 for use as the driver seat 12D includes a seat cushion 14 that supports the hip of an occupant, a seatback 16 that supports the back of the occupant and is supported by a rear end portion of the seat cushion 14 so as to be tiltable (reclinable), and a headrest (not illustrated) that supports the head of the occupant. The seatback 16 includes a main portion 18 disposed to face the back of the occupant in the front-rear direction, and side support portions 20 protruding toward the front side (occupant side) from both side portions, in the right-left direction, of the main portion 18. The airbag device 10, which will be described later in detail, is installed in a portion, on the vehicle width direction inner side, of the seatback 16 including the side support portions 20.

Like the vehicle seat 12 for use as the driver seat 12D, the vehicle seat 12 for use as the front passenger seat 12P includes a seat cushion 14 and a seatback 16. The vehicle seat 12 for use as the driver seat 12D and the vehicle seat 12 for use as the front passenger seat 12P are supported by a floor 26 of a cabin 24 via seat slide rails 22 and so on so as to be slidable in the front-rear direction. In this embodiment, the vehicle seat 12 for use as the driver seat 12D is disposed on the right side of the cabin 24, and the vehicle seat 12 for use as the front passenger seat 12P is disposed on the left side of the cabin 24. Further, a center console 28 is disposed between the vehicle seat 12 for use as the driver seat 12D and the vehicle seat 12 for use as the front passenger seat 12P.

In the following description, the vehicle seat 12 for use as the driver seat 12D will be referred to simply as the "driver seat 12D", and the vehicle seat 12 for use as the front passenger seat 12P will be referred to simply as the "front passenger seat 12P".

The airbag device 10 includes an inflator (not illustrated) configured to generate gas when activated, and an airbag 30 connected to the inflator and configured to be inflated when the gas generated by the inflator is supplied into the airbag 30, and to be deployed from a portion, on the vehicle width direction inner side, of the seatback 16 of the driver seat 12D. In FIG. 1, the airbag 30 is illustrated in section taken along the up-down direction and the vehicle width direction.

The airbag 30 includes a main bag portion 32 as a main bag configured to be deployed, in its most part in vehicle front view, between the driver seat 12D and the front passenger seat 12P and toward the lateral side of the occupant seated in the driver seat 12D. The airbag 30 further includes a sub-bag portion 34 as a sub-bag formed integrally with the main bag portion 32 and configured to protrude from a portion 32A of the main bag portion 32 in the upper part of the main bag portion 32 in a deployed state toward the seatback 16 side of the front passenger seat 12P.

The main bag portion 32 has an oval shape with its longitudinal direction along the up-down direction in vehicle front view after deployment, and has a rectangular shape, in vehicle side view, with a size that overlaps a range from the abdomen to the head of the occupant seated in the driver seat 12D in the vehicle width direction. It is configured that the range from the abdomen to the head of the occupant moved toward the vehicle width direction inner side (front passenger seat 12P side) is received by a surface 32B, on the right side, of the main bag portion 32.

The sub-bag portion 34 is formed to be gradually tapered toward the front passenger seat 12P side in vehicle front view after deployment. A surface 34A of the sub-bag portion 34 on the leading end side of a protruding direction of the sub-bag portion 34 is formed as a substantially flat surface and configured to face a surface 16B, on the vehicle width direction inner side, of an upper portion 16A of the seatback 16 of the front passenger seat 12P in the right-left direction. In this embodiment, the dimension of the sub-bag portion 34 in the front-rear direction is set so that even when the front-rear position of the front passenger seat 12P and the reclining angle of the seatback 16 are changed in predetermined ranges, the surface 34A of the sub-bag portion 34 on the leading end side of the protruding direction of the sub-bag portion 34 faces the surface 16B, on the vehicle width direction inner side, of the upper portion 16A of the seatback 16 of the front passenger seat 12P in the right-left direction. Further, in this embodiment, the capacity of the sub-bag portion 34 is set to be smaller than the capacity of the main bag portion 32. Consequently, the leakage rate (leakage rate from surfaces and seam portions) of gas in the sub-bag portion 34 is smaller than the leakage rate (leakage rate from surfaces and seam portions) of gas in the main bag portion 32.

The airbag 30 of this embodiment includes a partition wall 36 configured to separate a space in the main bag portion 32 and a space in the sub-bag portion 34. The partition wall 36 is provided with a check valve 38 that allows the flow of gas from the main bag portion 32 side to the sub-bag portion 34 side and prevents the flow of gas from the sub-bag portion 34 side to the main bag portion 32 side. As an example, it is possible to use a reed valve or the like as the check valve 38. With the check valve 38 provided and with the leakage rate of gas in the sub-bag portion 34 being smaller than the leakage rate of gas in the main bag portion 32, the pressure of gas in the sub-bag portion 34 becomes higher than the pressure of gas in the main bag portion 32 after the airbag 30 is inflated.

Operation and Effect of this Embodiment

Next, the operation and effect of this embodiment will be described.

When it is detected that a load F1 due to a side collision is applied from the left side of a vehicle including the airbag device 10 described above while the vehicle is traveling, the inflator (not illustrated) is activated to generate gas.

Then, the gas generated by the inflator is supplied into the airbag 30 so that the airbag 30 is inflated and deployed from the portion, on the vehicle width direction inner side, of the seatback 16 of the driver seat 12D.

Specifically, the gas generated by the inflator is supplied into the main bag portion 32 of the airbag 30 so that the main bag portion 32 is inflated to deploy toward the lateral side of the occupant seated in the driver seat 12D. Consequently, the range from the abdomen to the head of the occupant moved toward the vehicle width direction inner side (front passenger seat 12P side) can be received by the surface 32B, on the right side, of the main bag portion 32, and accordingly, it is possible to suppress that the occupant seated in the driver seat 12D comes in contact with an occupant seated in the front passenger seat 12P.

Further, part of the gas in the main bag portion 32 flows into the sub-bag portion 34 through the check valve 38 so that the sub-bag portion 34 is inflated. Consequently, the surface 34A of the sub-bag portion 34 on the leading end side of the protruding direction of the sub-bag portion 34 faces the surface 16B, on the vehicle width direction inner side, of the upper portion 16A of the seatback 16 of the front passenger seat 12P in the right-left direction.

Herein, when the main bag portion 32 is pressed toward the left side by the occupant seated in the driver seat 12D so that the portion 32A in the upper part of the main bag portion 32 starts to fall down toward the left side, the surface 34A of the sub-bag portion 34 on the leading end side of the protruding direction of the sub-bag portion 34 comes in contact with the surface 16B, on the vehicle width direction inner side, of the upper portion 16A of the seatback 16 of the front passenger seat 12P. Consequently, the fall-down of the portion 32A in the upper part of the main bag portion 32 toward the left side can be restricted by the sub-bag portion 34. The sub-bag portion 34 can be deployed regardless of whether or not the occupant is seated in the front passenger seat 12P.

The airbag device 10 of this embodiment is configured to include the airbag 30 in which the main bag portion 32 and the sub-bag portion 34 are formed integrally with each other, and further configured such that gas is supplied into the sub-bag portion 34 from the main bag portion 32 side. Consequently, it is possible to suppress an increase in the number of airbags 30 (a main bag portion 32 and a sub-bag portion 34) and an increase in the number of inflators that supply gas into the airbags 30.

Further, in the airbag device 10 of this embodiment, since the check valve 38 is provided and so on, the pressure of gas in the sub-bag portion 34 is higher than the pressure of gas in the main bag portion 32. Consequently, when the sub-bag portion 34 is pressed by the portion 32A in the upper part of the main bag portion 32, it is possible to suppress the deformation of the sub-bag portion 34. As a result, it is possible to further suppress the fall-down of the portion 32A in the upper part of the main bag portion 32 toward the left side.

In this embodiment, the description has been given of the example in which the check valve 38 is provided between the main bag portion 32 and the sub-bag portion 34, but the disclosure is not limited thereto. For example, like an airbag device 40 according to a second embodiment illustrated in FIG. 2, it may be configured that the check valve 38 is not provided. In the airbag device 40 according to the second embodiment, an opening (not illustrated) is formed in the partition wall 36 configured to separate the space in the main bag portion 32 and the space in the sub-bag portion 34. It is configured that part of gas in the main bag portion 32 flows into the sub-bag portion 34 through the opening. Herein, by adjusting the size of the opening, the number of openings, or the like or by providing a vent hole in such a way that the pressure of gas in the sub-bag portion 34 becomes higher than the pressure of gas in the main bag portion 32, the fall-down of the portion 32A in the upper part of the main bag portion 32 toward the left side can be effectively suppressed like the airbag device 10 according to the first embodiment. Note that, in the airbag device 40 according to the second embodiment, members and portions corresponding to those in the airbag device 10 according to the first embodiment are assigned the same symbols as those of the members and portions in the airbag device 10 according to the first embodiment.

Figure 2:
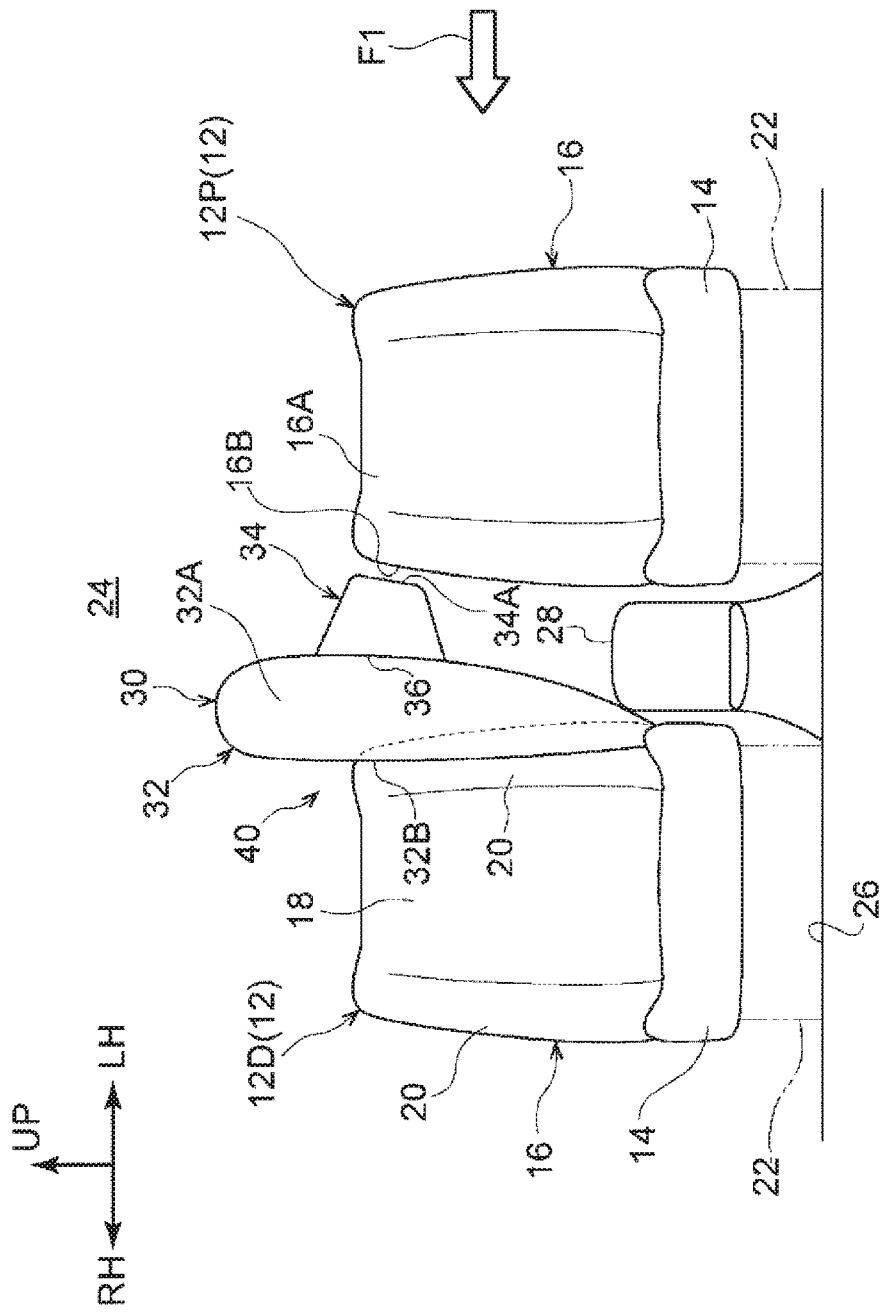
FIG. 2 is a front view in which a driver seat and a front passenger seat provided in a cabin are viewed from the vehicle front side, and illustrates a state in which an airbag of an airbag device according to a second embodiment is deployed.

In the first and second embodiments illustrated in FIGS. 1 and 2, the description has been given of the example in which the airbag 30 is configured to be deployed from the seatback 16 on the driver seat 12D side, but the disclosure is not limited thereto. For example, like airbag devices 42 according to a third embodiment illustrated in FIG. 3, it may be configured that the airbag 30 can be deployed from the seatback 16 on the driver seat 12D side (like in FIGS. 1 and 2), and further that the airbag 30 can be deployed from the seatback 16 on the front passenger seat 12P side. In this case, when a load F2 due to a side collision is applied from the right side of the vehicle, the airbag 30 is deployed from a portion, on the vehicle width direction inner side, of the seatback 16 of the front passenger seat 12P. In this way, by configuring that the airbags 30 can be deployed from both the driver seat 12D and the front passenger seat 12P, the movement of the occupant seated in the driver seat 12D toward the vehicle width direction inner side and the movement of the occupant seated in the front passenger seat 12P toward the vehicle width direction inner side can be suppressed according to the direction of a side collision. Note that, in the airbag device 42 according to the third embodiment, members and portions corresponding to those in the airbag device 10 according to the first embodiment are assigned the same symbols as those of the members and portions in the airbag device 10 according to the first embodiment.

Figure 3:
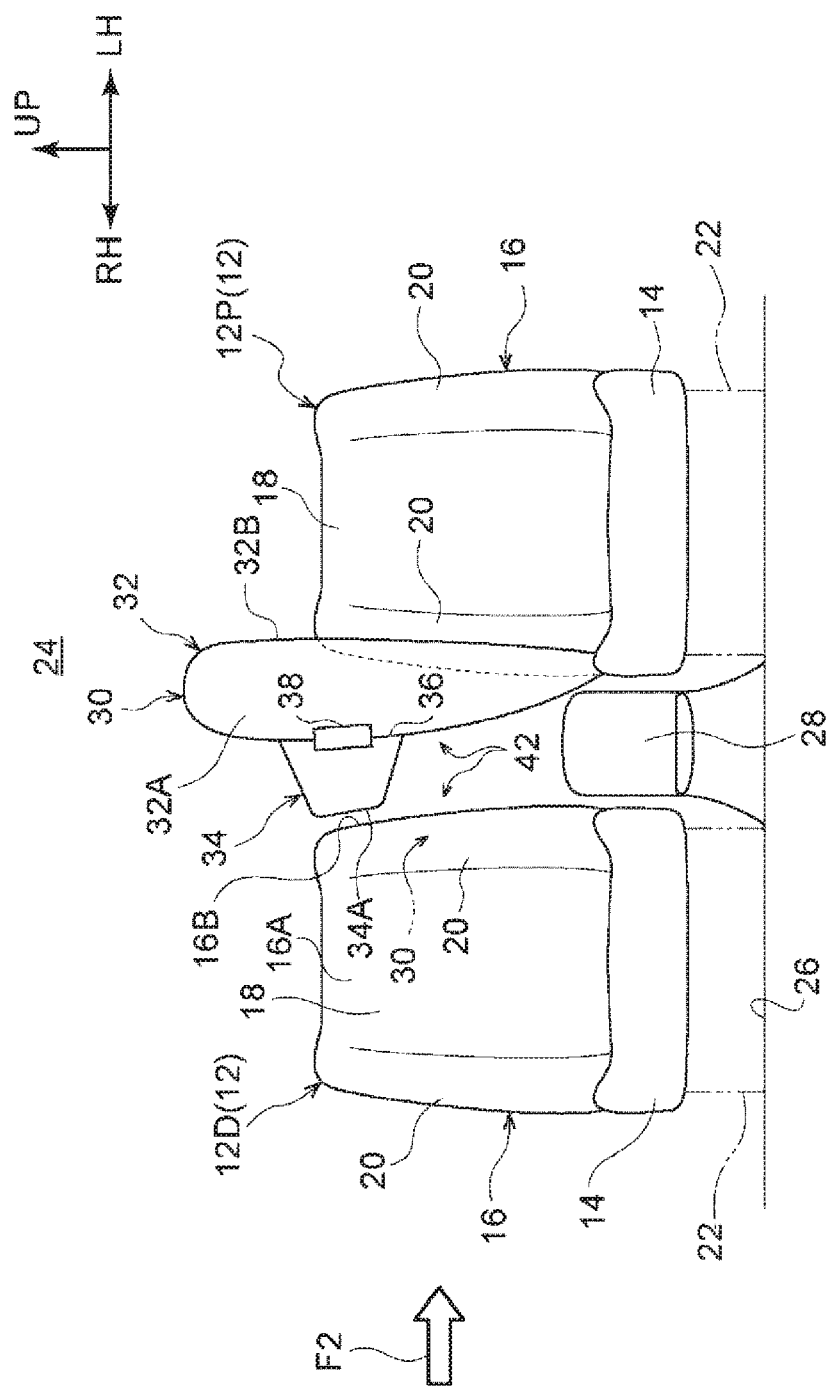
FIG. 3 is a front view in which a driver seat and a front passenger seat provided in a cabin are viewed from the vehicle front side, and illustrates a state in which an airbag of an airbag device according to a third embodiment is deployed from the front passenger seat side.
Figure 4:
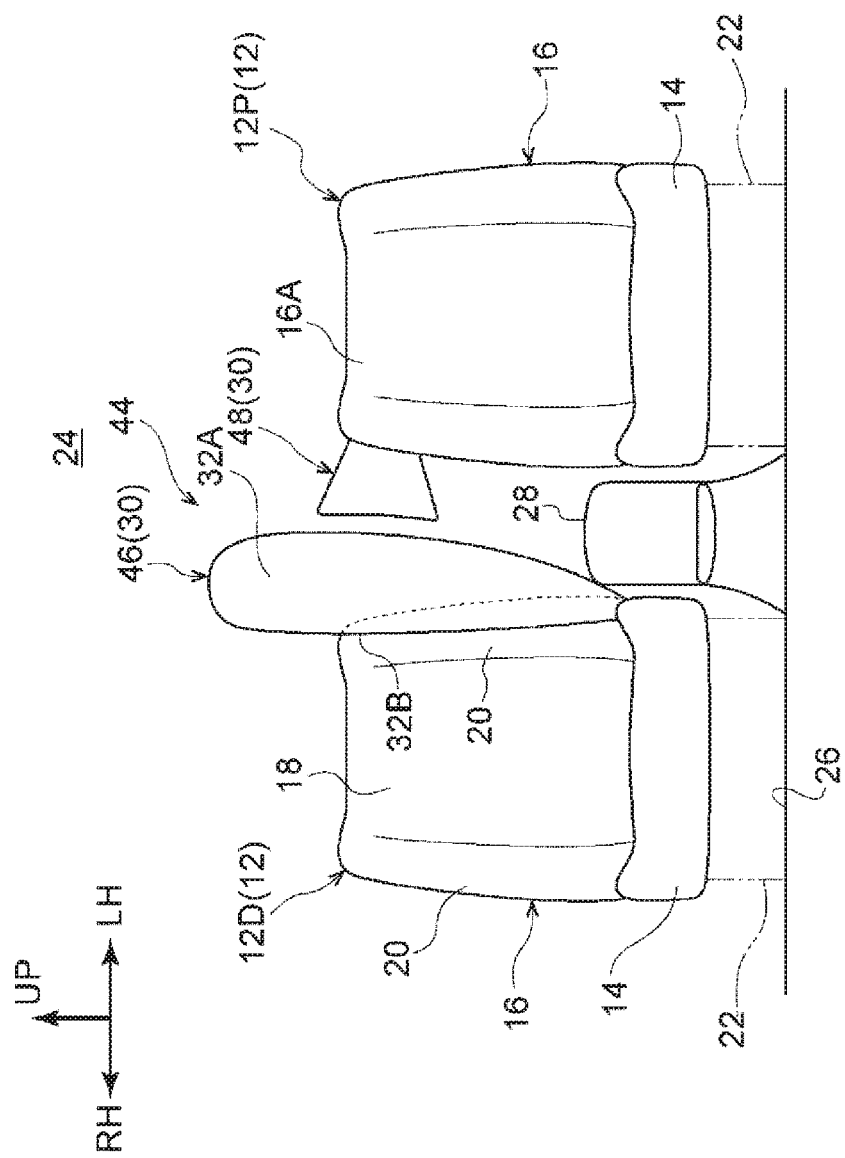
FIG. 4 is a front view in which a driver seat and a front passenger seat provided in a cabin are viewed from the vehicle front side, and illustrates a state in which airbags of an airbag device according to a fourth embodiment are deployed.

In the first to third embodiments illustrated in FIGS. 1 to 3, the description has been given of the example in which the main bag portion 32 and the sub-bag portion 34 are formed integrally with each other, but the disclosure is not limited thereto. For example, like an airbag device 44 according to a fourth embodiment illustrated in FIG. 4, it may be configured that a main bag 46 corresponding to the main bag portion 32 is deployed from the seatback 16 on the driver seat 12D side. In addition to this, it may be configured that a sub-bag 48 corresponding to the sub-bag portion 34 is deployed from the seatback 16 on the front passenger seat 12P side so as to be disposed between the portion 32A in the upper part of the main bag 46 and the upper portion 16A of the seatback 16. Note that, in the airbag device 44 according to the fourth embodiment, members and portions corresponding to those in the airbag device 10 according to the first embodiment are assigned the same symbols as those of the members and portions in the airbag device 10 according to the first embodiment.

While one embodiment of the disclosure has been described above, it goes without saying that the disclosure is not limited thereto and can be embodied with various modifications other than the above within a range not departing from the gist of the disclosure.

What is claimed is:

1. An airbag device comprising:
    an inflator;
    a main bag configured to be inflated when gas generated by the inflator is supplied into the main bag, the main bag configured to be deployed between first and second vehicle seats disposed adjacent to each other in a vehicle width direction in a vehicle front view and toward a lateral side of an occupant seated in the first vehicle seat; and
    a sub-bag configured to be inflated when gas generated by the inflator is supplied from the main bag into the sub-bag, the sub-bag configured to be disposed between a portion of the main bag in an upper part of the main bag and the second vehicle seat, the sub-bag and the main bag are formed integrally with each other, the sub-bag protrudes from the portion of the main bag in the upper part above a center of the main bag in a vehicle vertical direction toward a seatback of the second vehicle seat when the gas generated by the inflator is supplied into the sub-bag from the main bag, in a deployed state, a surface of the sub-bag on a leading end side faces a surface, on a vehicle width direction inner side, of an upper portion of the seatback of the second vehicle seat in the vehicle width direction.

2. The airbag device according to claim 1, wherein a pressure of the gas in the sub-bag is higher than a pressure of the gas in the main bag.

3. The airbag device according to claim 2, wherein:
    a partition wall configured to separate a space in the main bag and a space in the sub-bag is provided between the main bag and the sub-bag; and
    the partition wall is provided with a check valve that allows a flow of the gas from the main bag side to the sub-bag side and prevents the flow of the gas from the sub-bag side to the main bag side.

4. The airbag device according to claim 1, wherein the sub-bag is formed in a substantially trapezoidal shape so as to gradually narrow toward the second vehicle seat side in the vehicle front view after deployment.

5. An airbag device comprising:
    a main bag configured to be inflated when gas is supplied into the main bag, the main bag configured to be deployed between first and second vehicle seats disposed adjacent to each other in a vehicle width direction in a vehicle front view and toward a lateral side of an occupant seated in the first vehicle seat; and
    a sub-bag configured to be inflated when gas is supplied into the sub-bag, the sub-bag configured to be disposed between a portion of the main bag in an upper part of the main bag and the second vehicle seat, wherein:
    a pressure of the gas in the sub-bag is higher than a pressure of the gas in the main bag;
    the main bag and the sub-bag are provided on each of a first vehicle seat side and a second vehicle seat side;
    the main bag and the sub-bag provided on the first vehicle seat side are deployed at a time of a side collision from the second vehicle seat side;
    the main bag and the sub-bag provided on the second vehicle seat side are deployed at a time of a side collision from the first vehicle seat side; and
    in a deployed state, the sub-bag is positioned above a center of the main bag in a vehicle vertical direction and between the upper part of the main bag and an upper part of a seatback of the second vehicle seat.

6. The airbag device according to claim 5, wherein: a partition wall configured to separate a space in the main bag and a space in the sub-bag is provided between the main bag and the sub-bag; and the partition wall is provided with a check valve that allows flow of the gas from the main bag side to the sub-bag side and prevents flow of the gas from the sub-bag side to the main bag side.

* * * * *